(12) United States Patent
Yashan et al.

(10) Patent No.: US 11,493,364 B2
(45) Date of Patent: Nov. 8, 2022

(54) SENSOR SYSTEM FOR DETERMINING AT LEAST ONE ROTATION CHARACTERISTIC OF AN ELEMENT ROTATING AROUND AT LEAST ONE ROTATION AXIS

(71) Applicant: Robert Bosch GmbH, Stuttgart (DE)

(72) Inventors: Andre Yashan, Stuttgart (DE); Bernhard Opitz, Reutlingen-Betzingen (DE); Eduard Rolew, Leonberg (DE); Fabian Utermoehlen, Lippstadt (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 16/767,109

(22) PCT Filed: Oct. 16, 2018

(86) PCT No.: PCT/EP2018/078258
§ 371 (c)(1),
(2) Date: Jul. 23, 2020

(87) PCT Pub. No.: WO2019/110178
PCT Pub. Date: Jun. 13, 2019

(65) Prior Publication Data
US 2020/0378802 A1    Dec. 3, 2020

(30) Foreign Application Priority Data

Dec. 4, 2017    (DE) ...................... 10 2017 221 763.4

(51) Int. Cl.
*G01D 5/245* (2006.01)
*G01P 3/481* (2006.01)
(52) U.S. Cl.
CPC ............ *G01D 5/2454* (2013.01); *G01P 3/481* (2013.01)

(58) Field of Classification Search
CPC .... G01D 5/145; G01D 11/245; H02K 11/215; H02K 1/06; H02K 29/08; G01R 33/07; F02D 2200/602; G01B 7/30; G01L 5/221
(Continued)

(56) References Cited

U.S. PATENT DOCUMENTS

| 2014/0036132 A1 | 2/2014 | Pawlowski |
| 2018/0169868 A1* | 6/2018 | Jackowski ................. B25J 9/12 |

(Continued)

FOREIGN PATENT DOCUMENTS

| CN | 104969036 A | 10/2015 |
| CN | 107024232 A | 8/2017 |

(Continued)

OTHER PUBLICATIONS

International Search Report dated Jan. 29, 2019 in connection with International Application No. PCT/EP2018/078258.
(Continued)

*Primary Examiner* — Giovanni Astacio-Oquendo
(74) *Attorney, Agent, or Firm* — Norton Rose Fulbright US LLP; Gerard Messina

(57) ABSTRACT

A sensor system for determining at least one rotation characteristic of an element rotating around at least one rotation axis. The sensor system includes at least one sensor wheel, which is connectable to the rotating element, the sensor wheel having a sensor wheel profile. The sensor system also includes at least one position sensor and at least one phase sensor. The sensor system further includes at least one digital interface and at least one incremental interface, the sensor system being configured to output at least one absolute position signal generated with the aid of the position sensor via the digital interface and to output at least one incremental signal generated with the aid of the phase sensor via the incremental interface.

15 Claims, 3 Drawing Sheets

(58) Field of Classification Search
USPC .................. 324/207.25, 207.13, 207.11, 200
See application file for complete search history.

(56) References Cited

U.S. PATENT DOCUMENTS

| 2020/0032845 A1* | 1/2020 | McLaughlin ....... F16C 32/0444 |
| 2020/0228035 A1* | 7/2020 | Tada ...................... H02K 11/35 |
| 2020/0283112 A1* | 9/2020 | Redfern .............. F16H 25/2247 |
| 2020/0303987 A1* | 9/2020 | Stubner .................. H02K 15/14 |

FOREIGN PATENT DOCUMENTS

| CN | 107045071 A | 8/2017 |
| CN | 107407580 A | 11/2017 |
| DE | 4011503 A1 | 10/1991 |
| DE | 102004045849 A1 | 3/2006 |
| DE | 102012012870 A1 | 4/2014 |
| DE | 102013203937 A1 | 9/2014 |
| DE | 102014220458 A1 | 4/2016 |
| DE | 102016206714 A1 | 10/2017 |

OTHER PUBLICATIONS

"Sensoren im Kraftfahrzeug" (Sensors in Motor Vehicles), Publ. Konrad Reif, 2nd edition (2012), pp. 63-74 and 120-129 [cited in the specification of this patent application].

* cited by examiner

SENSOR SYSTEM FOR DETERMINING AT LEAST ONE ROTATION CHARACTERISTIC OF AN ELEMENT ROTATING AROUND AT LEAST ONE ROTATION AXIS

BACKGROUND INFORMATION

Numerous conventional sensors can detect at least one rotation characteristic of rotating elements. A rotation characteristic is generally understood to be a characteristic which at least partially describes the rotation of the rotating element. It may be, for example, an angular velocity, a rotational speed, an angular acceleration, a rotation angle or another characteristic which may characterize a continuous or discontinuous, uniform or non-uniform rotation or turning of the rotating element. Examples of sensors of this type are described in Konrad Reif (publisher): "Sensoren im Kraftfahrzeug" (Sensors in Motor Vehicles), 2nd edition, 2012, pp. 63 through 74 and 120 through 129.

For example, a rotational speed of a rotor or an angular position of a rotor of an electric machine, in particular an electric machine of an electric vehicle, may be determined. Furthermore, a position of a camshaft of an internal combustion engine relative to a crankshaft including a so-called phase sensor, may be determined with the aid of a Hall sensor. A sensor wheel is typically mounted on the rotating axis. Teeth may be situated on the sensor wheel, which are scanned by the Hall sensor when the camshaft rotates.

Thus, a device for detecting a rotating part of an internal combustion engine is described in German Patent No. DE 40 11 503 A1, in which the rotating part is a sensor wheel disk provided with a large number of regular teeth. A sensor arrangement for the contactless detection of rotation angles at a rotating component is furthermore described in German Patent Application DE 10 2014 220 458 A1, the rotating component being coupled with a disk-shaped target. An electric machine is further described in German Patent Application DE 10 2013 203 937 A1, which includes a rotor, which is rotatably supported around a rotation axis in a stator, at least one optical sensor being provided, which is supported in a stationary manner with respect to the stator and which has an optical detection area. The rotor includes a marking device, which has at least one optical marking.

Despite the improvements brought about by sensor devices of this type, improvement potential still exists. Sensor devices of the type described thus often require a great deal of installation space. In the case of a defect, replacement is generally possible only with considerable complexity. In addition, a high degree of circuit complexity frequently exists. Moreover, a contouring error and a lack of accuracy frequently associated therewith generally play a great role, for example in measuring the rotation angle, in particular at high rotational speeds.

SUMMARY

In accordance with the present invention, an example sensor system is provided for determining at least one rotation characteristic of a rotating element. Within the scope of the present invention, a "sensor system for determining at least one rotation characteristic of a rotating element" may generally be understood to be any device which is suitable for detecting the at least one rotation characteristic and which may generate, for example, at least one electrical signal corresponding to the detected characteristic, for example a voltage or a current.

Combinations of characteristics may also be detected. Within the scope of the present invention, a "rotation characteristic" may generally be understood to be a characteristic which at least partially describes the rotation of the rotating element. It may be, for example, an angular velocity, a rotational speed, an angular acceleration, an angular position or another characteristic which may at least partially characterize a continuous or discontinuous, uniform or non-uniform rotation or turning of the rotating element. For example, the rotation characteristic may be a position, in particular an angular position, or a rotational speed or a combination of the two variables. Other characteristics and/or other combinations of characteristics may also be detectable. Within the scope of the present invention, an "angular position" may generally be understood to be a rotation angle of a rotatable device, for example the rotating element or the sensor wheel, with respect to an axis situated perpendicularly to the rotation axis.

The sensor system may be configured, in particular, for use in a motor vehicle, in particular in an internal combustion engine or an electric motor. Within the scope of the present invention, a "rotating element" may generally be understood to be any element which has a rotation axis and rotates around it. For example, the rotating element may be a shaft in a main engine, for example a camshaft. For example, an angular position of a camshaft or a rotational speed of a camshaft or a combination of the two variables may be determined. In addition, the rotating element may be a rotating element of an electric motor, for example a rotor.

In accordance with an example embodiment of the present invention, the sensor system for determining at least one rotation characteristic of a rotating element rotating around at least one rotation axis includes a sensor wheel, which is connectable to the rotating element. The sensor wheel has a sensor wheel profile. The sensor system includes at least one position sensor and at least one phase sensor. The sensor system further includes at least one digital interface and at least one incremental interface, the sensor system being configured to output at least one absolute position signal generated with the aid of the position sensor via the digital interface and to output at least one incremental signal generated with the aid of the phase sensor via the incremental interface.

Within the scope of the present invention, a "sensor wheel" may generally be understood to be any structural element, which is connectable to the rotating element and which is configured to induce at least one measurable signal per revolution of the rotating element, in particular a magnetic field change, when connected to the rotating element. Within the scope of the present invention, a "sensor wheel profile" may generally be understood to be the totality of profile elements and intermediate spaces of the sensor wheel arranged between the profile elements. Moreover, the sensor wheel profile may also be understood to be the arrangement, for example the sequence, of the profile elements. Within the scope of the present invention, a "profile element" of the sensor wheel may generally be understood to be any element which contributes, as part of the sensor wheel, to the inducement of the at least one measurable signal per revolution of the rotating element when the sensor wheel is connected to the rotating element. In particular, the profile element may be any molding of the contour of the sensor wheel, in particular a bulge, for example, a pin-shaped, a tooth-shaped or a serrated bulge, or a notch or a recess, for example a hole. However, the profile element may also leave a, for example circular, contour of the sensor wheel unchanged. In particular, the profile element may contribute to the generation of the measurable signal due to electrical, magnetic or optical characteristics. For example, a sensor wheel, in particular a sensor wheel having a circular contour, may include a plurality of profile elements, which may be arranged in such a way that at least one electrically conductive profile element is followed by at least one electrically non-conductive profile element. In particular, the at least one profile element may include at least one material selected from the group made up of: an electrically conductive material; a ferromagnetic material; a metal. Moreover, the sensor wheel may include a material selected from the group made up of: an electrically conductive material; a ferromagnetic material; a metal. The sensor system may further include at least two sensor wheels, in particular two sensor wheels including different sensor wheel profiles.

Within the scope of the present invention, a "position sensor" may be understood to be any sensor which may detect at least one rotation characteristic, including an angular position, and which may generate the, for example at least one electrical measuring signal corresponding to the angular position, for example a voltage or a current. The position sensor may be, for example, an inductive position sensor, a generation of the measuring signal by the inductive position sensor being based on a change of a magnetic flux. The position sensor, in particular the inductive position sensor, may thus include at least one coil, in particular a plurality of at least 2 coils, for example at least one exciter coil and at least one receiver coil, in particular at least 2 receiver coils, preferably 3 receiver coils. In particular, the receiver coils may each be made up of at least two partial windings, the directly consecutive partial windings being able to be oppositely oriented. In particular, the receiver coils may have an electrical phase shift with respect to each other. In particular, the position sensor may preferably include 3 receiver coils, and the 3 receiver coils may have an electrical phase shift of 120° with respect to each other. Moreover, the partial windings of the different receiver coils may be arranged offset from each other according to the electrical phase shift of the different receiver coils. Within the scope of the present invention, an "exciter coil" may generally be understood to be a coil which generates a magnetic flux upon the application of a voltage and/or an electrical current. In particular, an alternating current of 2 MHz to 10 MHz, preferably of 4 MHz to 6 MHz, particularly preferably of 5 MHz, may be applied to the exciter coil. Within the scope of the present invention, a "receiver coil" may generally be understood to be a coil which is configured to generate a signal, based on an inductive coupling between the exciter coil and the receiver coil, which is dependent on the inductive coupling. However, position sensors are possible, which are based on other measuring principles or other principles of measuring signal generation.

The sensor system further includes a phase sensor. Within the scope of the present invention, a "phase sensor" may be generally understood to be any sensor which is suitable for generating at least one electrical measuring signal at least once per revolution, in particular a voltage or a current, corresponding to a characteristic of a rotating element, which includes at least one signal generator and which at least partially describes the rotation of the rotating element. The characteristic may be, for example, a rotational speed, an angular speed, an angular acceleration or an angular position. Other characteristics or combinations of characteristics may also be detectable. Within the scope of the present invention, a "signal generator" may generally be understood to be any device situated on the rotating element or connected or connectable to the rotating element, which is suitable for inducing at least one measurable signal per revolution of the rotating element, for example a magnetic field change. For example, the sensor wheel described above and discussed in greater detail further below, in particular the at least one profile element of the sensor wheel, may act as a signal generator. The phase sensor may include at least one magnetic field generator, in particular at least one permanent magnet and/or at least one electromagnet. Moreover, the phase sensor may include at least one magnetic sensor element, in particular a magnetic sensor element selected from the group made up of: a Hall element, a magnetoresistive element. The phase sensor may also include at least one coil.

The sensor system includes at least one digital interface. Within the scope of the present invention, a "digital interface" may generally be understood to be any interface which may convert at least one incoming signal into at least one outgoing signal, the outgoing signal including at least one digital signal. In particular, the incoming signal may be at least one analog signal. For example, the signal converted by the digital interface may be provided for a transmission to a control unit. The sensor system further includes at least one incremental interface. Within the scope of the present invention, an "incremental interface" may generally be understood to be any interface which is configured to convert at least one incoming signal of a phase sensor into at least one outgoing signal. The incremental interface may be provided, in particular, with a completely or partially digital and/or analog design. The incoming signal of the phase sensor may be, in particular, at least one analog signal. The outgoing signal may be, in particular, at least one digital signal. For example, the signal converted by the incremental interface may be provided for a transmission to a control unit. In particular, the incremental interface may be designed to be separate from the digital interface.

Within the scope of the present invention, an "absolute position signal" may generally be understood to be an electrical measuring signal generated by the position sensor. The absolute position signal may be the electrical measuring signal generated according to the at least one detected rotation characteristic having an angular position. In particular, the absolute position signal may include at least one analog signal. Within the scope of the present invention, an "incremental signal" may generally be understood to be an electrical measuring signal generated by the phase sensor. The incremental signal may be the electrical measuring signal generated according to a characteristic of the rotating element. In particular, the incremental signal may include at least one periodic signal. In particular, the incremental signal may occur at least once per revolution of the rotating element. Moreover, the incremental signal may include at least one analog signal.

The sensor system may also include at least one control unit, the control unit being configurable to detect the position signal and the incremental signal via the interfaces. Within the scope of the present invention, a "control unit" may generally be understood to be any electronic module which includes at least one electrical and/or electronic circuit, which is configured to activate at least one sensor element for a measurement, for example a position sensor and/or a phase sensor, and/or to receive at least one measuring signal of the sensor element. In particular, the control unit may include one of the multiple electronic structural elements, for example at least one amplifier, at least one memory element, at least one data processing device or combinations of the aforementioned and/or other elements.

The control unit may be configured, in particular, to check the absolute position signal with the aid of the incremental signal and to optionally correct it. The control unit may be further configured to ascertain at least one contouring error of the absolute position signal with the aid of the incremental signal. In particular, a time period of an output of the absolute position signal via the digital interface and/or a time period of a digital transmission may contribute to the contouring error. A computing time for a determination of the angular position from the electrical measuring signal may also contribute to the contouring error. Within the scope of the present invention, a "contouring error" may generally be understood to be a deviation between the value of a measured variable determined from a measuring signal and the actual value of the measured variable, the deviation being at least partially based on a time difference between the measuring point in time and an output of the measured value. The control unit may be further configured to determine at least one second position signal with the aid of the absolute position signal and the incremental signal, the rotation characteristic being determinable from the second position signal. In particular, the control unit may be configured to determine the second position signal by a correction of the absolute position signal with the aid of the incremental signal. Within the scope of the present invention, a "correction" may be understood to be an at least partial elimination or correction of at least one error. For example, the error may include the contouring error. The control unit may be further configured to compare the second position signal with the absolute position signal. In particular, the control unit may be configured to form a difference D between the absolute position signal and the second position signal. The control unit may be further configured to determine the rotation characteristic from the absolute position signal if difference D is less than a threshold value $D_s$, the control unit being further configurable to determine the rotation characteristic from the second position signal if difference D is greater than threshold value $D_s$. Threshold value $D_s$ may be assigned to one of the ranges. In particular, threshold value $D_s$ may include a value of difference D between the absolute position signal and the second position signal. In particular, threshold value $D_s$ may include the value of difference D between the absolute position signal and the second position signal, and the value of the difference may have a value of 0.1° to 1°, in particular electrical or between electrical position signals. Threshold value $D_s$ may also include a frequency of the incremental signal.

The sensor system includes at least one digital interface and at least one incremental interface. The digital interface may include at least one of the following elements: a SENT interface; a PSI5 interface. The abbreviation SENT stands for "single-edge nibble transmission." In addition, the abbreviation PSI5 stands for "peripheral sensor interface 5." The incremental interface may include at least one of the following elements: a comparator circuit; a Schmitt trigger. In particular, the incremental interface may be configured to convert the incremental signal of the phase sensor into a digital signal with the aid of the comparator circuit and/or with the aid of the Schmitt trigger. The sensor system may be further configured to output at least one piece of sensor status information via the digital interface. In particular, the absolute position signal output via the digital interface may include the piece of sensor status information. Within the scope of the present invention, a "piece of sensor status information" may generally be understood to be a content, in particular at least one piece of information, related to at least one sensor system or at least one sensor element. In particular, the sensor element may be the position sensor and/or the phase sensor. In particular, the piece of sensor status information may be at least one content, in particular at least one piece of information, relating to a sensor type, a manufacturer identifier and/or a defect of the sensor system or of the sensor element.

The sensor system may further include at least one evaluation unit, the evaluation unit being able to include at least one first evaluation circuit, the first evaluation circuit being configured to prepare the absolute position signal. In addition, the first evaluation circuit may be configured to forward the absolute position signal to the control unit via the at least one digital interface. In particular, the first evaluation circuit may include the digital interface. The evaluation unit may also include at least one second evaluation circuit, the second evaluation circuit being configured to prepare the incremental signal. In addition, the second evaluation circuit may be configured to forward the incremental position signal to the control unit via the at least one incremental interface. In particular, the second evaluation circuit may include the incremental interface. The first and second evaluation circuits may be designed to be completely or partially separate. However, they may also be designed to be completely or partially together, for example on a shared circuit carrier.

In another aspect of the present invention, an example method is described for determining at least one rotation characteristic of an element rotating around at least one rotation axis. The method includes the use of at least one sensor wheel, which is connectable to the rotating element, the sensor wheel having a sensor wheel profile. The method includes the following steps, preferably in the specified sequence. Another sequence is also possible. Furthermore, one or multiple or all method steps may also be carried out repeatedly. Moreover, two or multiple of the method steps may also be carried out entirely or partially overlapping in time or simultaneously. In addition to the specified method steps, the method may also include additional method steps.

In accordance with an example embodiment, the method steps include:
a) generating at least one absolute position signal with the aid of at least one position sensor;
b) generating at least one incremental signal with the aid of at least one phase sensor;
c) outputting the absolute position signal to at least one control unit via at least one digital interface;
d) outputting the incremental signal to the control unit via at least one incremental interface; and
e) determining the rotation characteristic by the control unit with the aid of at least one of the following signals: the absolute position signal; the incremental signal.

The method may be carried out, in particular, using a sensor system according to the present invention, i.e., according to one of the aforementioned specific embodiments or according to one of the specific embodiments described in greater detail below. Accordingly, reference may be largely made to the description of the sensor elements for definitions and optional designs. However, other designs are also possible, in principle.

Within the scope of the present invention, the expression from step e), "determining the rotation characteristic by the control unit with the aid of at least one of the following signals: the absolute position signal; the incremental signal," may be understood to mean, in particular, that the rotation characteristic is determined from the absolute position signal; or that the rotation characteristic is determined from the incremental signal; or that the rotation characteristic is determined using the absolute position signal and/or using the incremental signal. In step e), in particular, a second position signal may be generated by the control unit by correcting the absolute position signal with the aid of the incremental signal, the rotation characteristic being determined with the aid of the second position signal. The example method may further include a step f):

f) comparing the second position signal with the absolute position signal.

The comparison may further include a formation of a difference D between the absolute position signal and the second position signal. In particular, the rotation characteristic may be determined using the absolute position signal if difference D is less than a threshold value $D_s$, the rotation characteristic being able to be determined using the second position signal if difference D is greater than threshold value $D_s$. In particular, threshold value $D_s$ may include a value of difference D between the absolute position signal and the second position signal. Threshold value $D_s$ may also include a frequency of the incremental signal. The output of the absolute position signal in step c) may also take place with the aid of at least one digital interface, which includes at least one SENT interface and/or at least one PSI5 interface. The output of the incremental signal in step d) may also take place with the aid of at least one incremental interface, which includes at least one comparator circuit and/or at least one Schmitt trigger. In particular, the method may include the preparation of the at least one absolute position signal by a first evaluation circuit. In addition, the method may include the preparation of the at least one incremental signal by at least one second evaluation circuit. In particular, the first evaluation circuit and the second evaluation circuit may be situated on a shared circuit carrier. Alternatively, the first evaluation circuit and the second evaluation circuit may be situated on two separate circuit carriers. The method may also include an output of at least one piece of sensor status information. In particular, the piece of sensor status information may be output via the at least one digital interface. In particular, the absolute position signal output via the digital interface may include the piece of sensor status information.

The example device and the example method in accordance with the present invention have numerous advantages over conventional devices and methods. In particular, it may be possible that the sensor system according to the present invention and the method according to the present invention may have a greater accuracy than the related art in determining the at least one rotation characteristic of the element rotating around at least one rotation axis, in particular since it is possible that a redundant piece of sensor information, and thereby an additional plausibility capability of the electrical measuring signal, in particular the absolute position signal, may be present due to the incremental signal. In particular, a functional security may be increased thereby, compared to the related art. It may furthermore be possible that the incremental signal, in particular pulses corresponding to an incremental angle, is output via the incremental interface, in particular transmitted in real time. It may also be possible that an adaptation of the control unit, in particular the control device, does not have to be carried out, in particular since it may be possible that the determination of the at least one rotation characteristic of the element rotating around at least one rotation axis with the aid of the sensor system according to the present invention and/or the method according to the present invention may be based on conventional protocols. It may furthermore be possible that only one additional line may be necessary during a use of the sensor element according to the present invention and/or the method according to the present invention. It may also be possible that the incremental signal has, in particular, a higher sampling rate compared to the related art.

BRIEF DESCRIPTION OF THE DRAWINGS

Other optional details and features of the present invention result from the following description of preferred exemplary embodiments, which are schematically shown in the figures.

DETAILED DESCRIPTION OF EXAMPLE EMBODIMENTS

Figure 1:
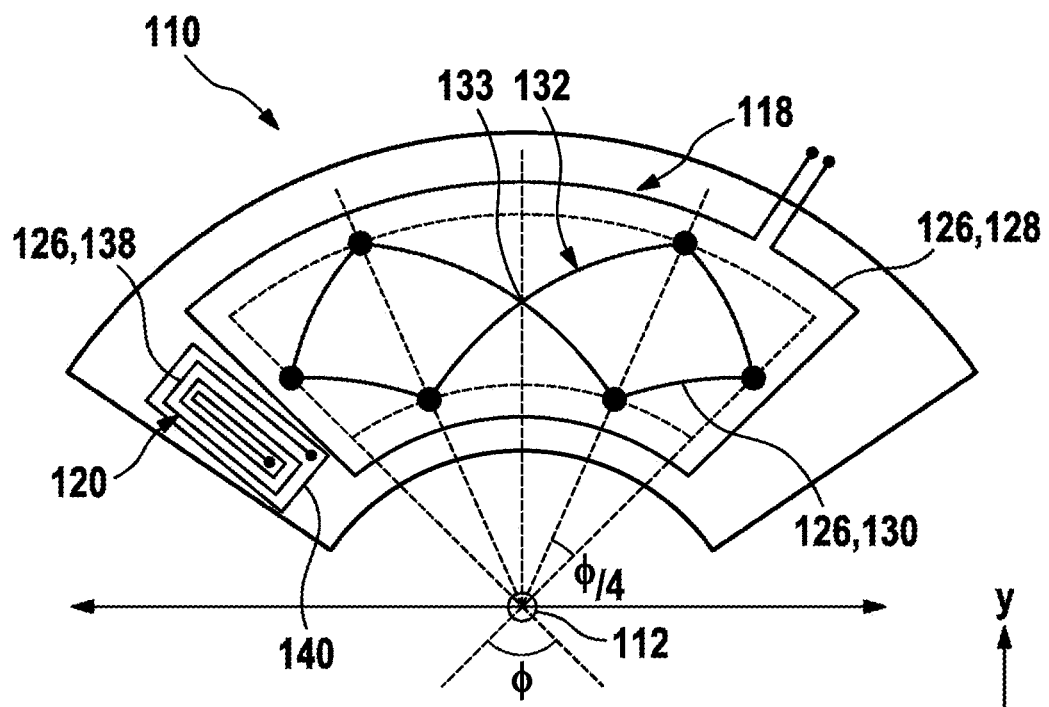
FIG. 1 shows a detail of a sensor system according to the present invention in a top view.
Figure 2:
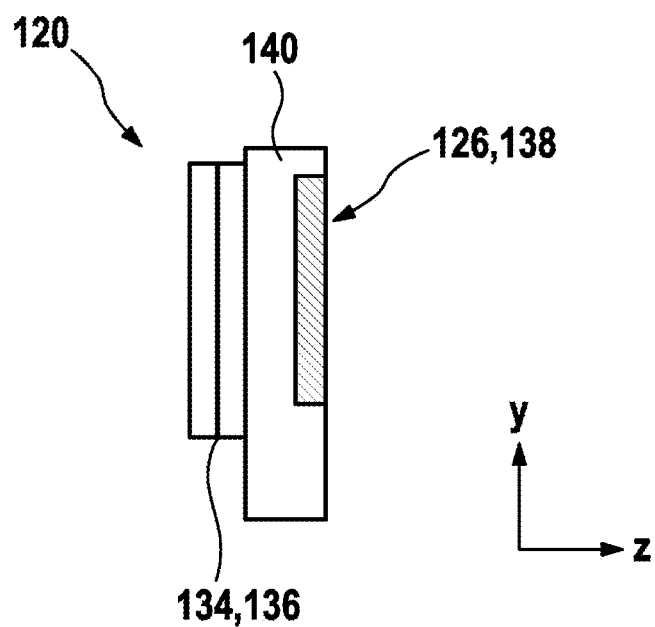
FIG. 2 shows a phase sensor in a cross-sectional view.

FIGS. 1 and 2 each show a detail of an example sensor system 110 according to the present invention for determining at least one rotation characteristic of an element rotating around at least one rotation axis 112. Sensor system 110 includes a sensor wheel 114, which is connectable to the rotating element. Sensor wheel 114 has a sensor wheel profile 116. Sensor system 110 includes at least one position sensor 118 and at least one phase sensor 120. Sensor system 110 further includes at least one digital interface 122 and at least one incremental interface 124, sensor system 110 being configured to output at least one absolute position signal generated with the aid of position sensor 118 via digital interface 122 and to output at least one incremental signal generated with the aid of phase sensor 120 via incremental interface 124.

As illustrated in FIG. 1, position sensor 118 may be, for example, an inductive position sensor 118, a generation of the measuring signal by inductive position sensor 118 being based on a change of a magnetic flux. Position sensor 118, in particular inductive position sensor 118, may thus include at least one coil 126, in particular a plurality of at least 2 coils 126. In particular, inductive position sensor 118 may include at least one exciter coil 128 and at least one receiver coil 130, in particular at least 2 receiver coils 130, preferably 3 receiver coils 130. An inductive position sensor 118, which includes a receiver coil 130, is illustrated as an example in FIG. 1. In particular, receiver coils 130 may each be made up of at least two partial windings 132, directly consecutive partial windings 132 being able to be oppositely oriented, as is also illustrated in FIG. 1. As is likewise illustrated in FIG. 1, the at least one receiver coil 130 may have at least one crossing point 133, coil sections of receiver coil 130, which are involved in forming crossing point 133, being able to move past each other in crossing point 133 without touching each other. In particular, receiver coils 130 may have an electrical phase shift with respect to each other. In particular, position sensor 118 may preferably include 3 receiver coils 130, and the 3 receiver coils 130 may have an electrical phase shift of 120° with respect to each other. Moreover, partial windings 132 of the different receiver coils 130 may be arranged offset from each other according to the electrical phase shift of the different receiver coils 130. In particular, an alternating current of 2 MHz to 10 MHz, preferably of 4 MHz to 6 MHz, particularly preferably of 5 MHz, may be applied to exciter coil 128. In particular, position sensor 118 may have a measuring range. In particular, the position sensor may generate a unique measuring signal for an angular position of the rotating element in the measuring range. As shown in FIG. 1, the measuring range may be at least partially describable by an angle θ. To better understand the perspective and the viewing direction, coordinate systems are drawn in FIGS. 1 and 2. However, position sensors 118 are possible, which are based on other measuring principles or other principles of measuring signal generation.

As illustrated in FIG. 1, sensor system 110 also includes a phase sensor 120. FIG. 2 shows phase sensor 120 in a cross-sectional view. The phase sensor may include at least one magnetic field generator 134, in particular at least one permanent magnet 136 and/or at least one electromagnet, as is apparent in FIG. 2. Moreover, phase sensor 120 may include at least one magnetic sensor element, in particular a magnetic sensor element selected from the group made up of: a Hall element, a magnetoresistive element. Alternatively or additionally, phase sensor 120 may include at least one coil 118, in particular a planar coil 138. For example, coil 118, in particular planar coil 138, may be mounted on a circuit board 140, as illustrated in FIG. 2.

Figure 3:
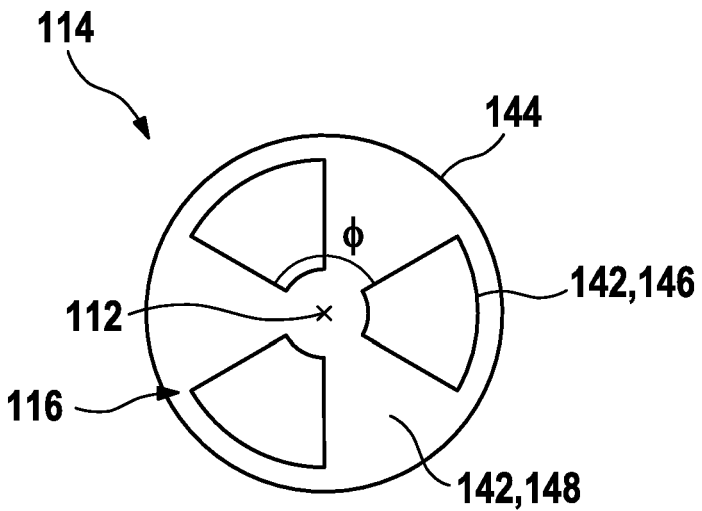
FIG. 3 shows a sensor wheel of a sensor system according to the present invention in a top view.

Example sensor system 110 according to the present invention further includes a sensor wheel 114 having a sensor wheel profile 116. FIG. 3 shows an example of a sensor wheel 114, which has a sensor wheel profile 116 including a plurality of profile elements 142. As illustrated in FIG. 3, the at least one profile element 142 may also leave a, for example circular, contour 144 of sensor wheel 114 unchanged. In particular, profile element 142 may contribute to the generation of the measurable signal due to electrical, magnetic or optical characteristics. For example, a sensor wheel 114, in particular a sensor wheel 114 having a circular contour 144, may include a plurality of profile elements 142, which may be arranged in such a way that at least one electrically conductive 146 profile element 142 is followed by at least one electrically non-conductive 148 profile element 142. In particular, the at least one profile element 142 may include at least one material selected from the group made up of: an electrically conductive 146 material; a ferromagnetic material; a metal. Moreover, the sensor wheel may include a material selected from the group made up of: an electrically conductive 146 material; a ferromagnetic material; a metal. Sensor system 110 may further include at least two sensor wheels 114, in particular two sensor wheels 114 having different sensor wheel profiles 116.

Figure 4:
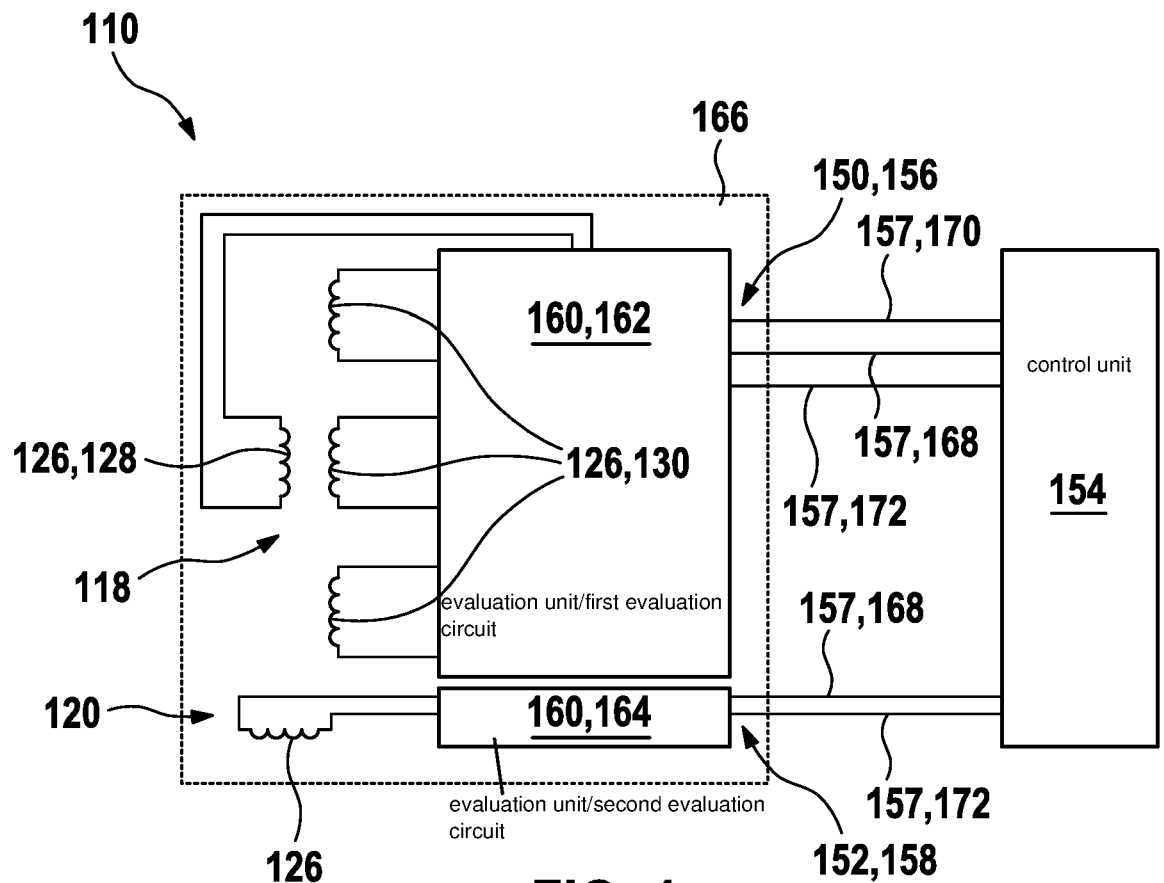
FIG. 4 shows a further detail of a sensor system according to the present invention in a top view.

FIG. 4 shows a detail of sensor system 110 with a focus on the at least one digital interface 150 and the at least one incremental interface 152 of sensor system 110. The signal of position sensor 118 arriving at digital interface 150 may be at least one analog signal, in particular an absolute position signal generated by the position sensor, as illustrated in FIG. 4. As also illustrated in FIG. 4, the signal converted by digital interface 150 may be provided for a transmission to a control unit 154. Sensor system 110 further includes at least one incremental interface 152. Incremental interface 152 may be provided, in particular, with a completely or partially digital and/or analog design. The signal of phase sensor 120 arriving at incremental interface 152 may be, in particular, at least one analog signal. The outgoing signal may be, in particular, at least one digital signal.

As illustrated in FIG. 4, the signal converted by incremental interface 152 may also be provided for a transmission to a control unit 154. In particular, incremental interface 152 may be designed to be separate from digital interface 150.

As illustrated in FIG. 4, sensor system 110 may also include at least one control unit 154. Control unit 154 may be configured to detect the position signal and the incremental signal via interfaces 150, 152. In particular, control unit 154 may include one or multiple electronic structural elements, which are not illustrated here, for example at least one amplifier, at least one memory element, at least one data processing device or combinations of the aforementioned and/or other elements. Control unit 154 may be configured, in particular, to check the absolute position signal with the aid of the incremental signal and to optionally correct it. Control unit 154 may be further configured to ascertain at least one contouring error of the absolute position signal with the aid of the incremental signal. Control unit 154 may also be configured to determine at least one second position signal with the aid of the absolute position signal and the incremental signal, the rotation characteristic being determinable from the second position signal. In particular, control unit 154 may be configured to determine the second position signal by a correction of the absolute position signal with the aid of the incremental signal. Control unit 154 may be further configured to compare the second position signal with the absolute position signal. In particular, control unit 154 may be configured to form a difference D between the absolute position signal and the second position signal. Control unit 154 may also be configured to determine the rotation characteristic from the absolute position signal if difference D is less than a threshold value $D_s$, control unit 154 being further configurable to determine the rotation characteristic from the second position signal if difference D is greater than threshold value $D_s$. Threshold value $D_s$ may be assigned to one of the ranges. In particular, threshold value $D_s$ may include a value of difference D between the absolute position signal and the second position signal. In particular, threshold value $D_s$ may include the value of difference D between the absolute position signal and the second position signal, and the value of the difference may have a value of 0.1° to 1°, in particular electrical position signals. Threshold value $D_s$ may also include a frequency of the incremental signal.

Sensor system 110 includes at least one digital interface 150 and at least one incremental interface 152. As illustrated in FIG. 4, digital interface 150 may include at least one of the following elements: a SENT interface 156; a PSI5 interface. The abbreviation SENT stands for "single-edge nibble transmission." In addition, the abbreviation PSI5 stands for "peripheral sensor interface 5." In particular, SENT interface 156 may include at least three lines 157, in particular at least one signal line 168, at least one voltage supply line 170 and at least one ground line 172. As also illustrated in FIG. 4, incremental interface 152 may include at least one of the following elements: a comparator circuit; a Schmitt trigger 158. In particular, incremental interface 152 may include at least two lines 157, in particular at least one ground line 172 and at least one signal line 168, which may be configured, in particular, to forward the incremental signal. In particular, incremental interface 152 may be configured to convert the incremental signal of phase sensor 120 into a digital signal with the aid of the comparator circuit and/or with the aid of Schmitt trigger 158. Sensor system 110 may also be configured to output at least one piece of sensor status information via digital interface 150. In particular, the absolute position signal output via digital interface 150 may include the piece of sensor status information. In particular, the piece of sensor status information may include at least one content relating to a sensor type, a manufacturer identifier and/or a defect of sensor system 110, in particular of position sensor 118 and/or of phase sensor 120.

As illustrated in FIG. 4, sensor system 110 may further include at least one evaluation unit 160, evaluation unit 160 being able to include at least one first evaluation circuit 162, first evaluation circuit 162 being configured to prepare the absolute position signal. In addition, first evaluation circuit 162 may be configured to forward the absolute position signal to control unit 154 via the at least one digital interface 150. In particular, first evaluation circuit 162 may include digital interface 150. As illustrated in FIG. 4, evaluation unit 160 may also include at least one second evaluation circuit 164, second evaluation circuit 164 being configured to prepare the incremental signal. In addition, second evaluation circuit 164 may be configured to forward the incremental position signal to control unit 154 via the at least one incremental interface 124. In particular, second evaluation circuit 164 may include incremental interface 152. First evaluation circuit 162 and second evaluation circuit 164 may be designed to be completely or partially separate. However, they may also be designed to be completely or partially together, for example on a shared circuit carrier 166.

In another aspect of the present invention, an example method is provided for determining at least one rotation characteristic of an element rotating around at least one rotation axis.

The example method includes the use of at least one sensor wheel 114, which is connectable to the rotating element, sensor wheel 114 having a sensor wheel profile 116. The method includes the following steps, preferably in the specified sequence. Another sequence is also possible. Furthermore, one or multiple or all method steps may also be carried out repeatedly. Moreover, two or multiple of the method steps may also be carried out entirely or partially overlapping in time or simultaneously. In addition to the specified method steps, the method may also include additional method steps.

Figure 5:
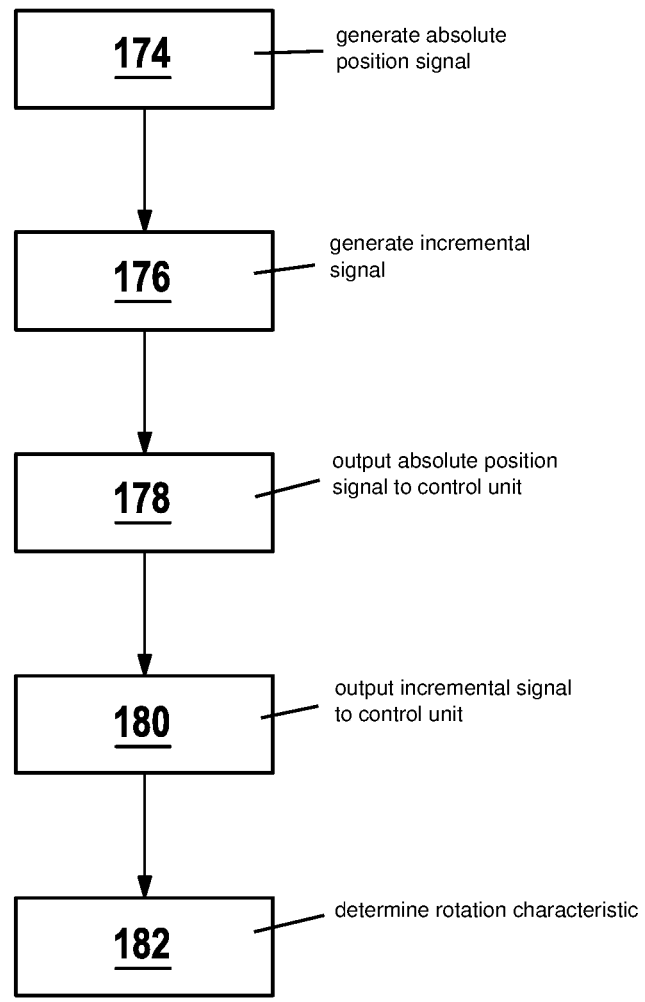
FIG. 5 shows a flowchart of a method according to the present invention for determining at least one rotation characteristic of an element rotating around at least one rotation axis.

As illustrated in FIG. 5, the method includes a generation of at least one absolute position signal by at least one position sensor 118 in a first step a) (method step 174); a generation of at least one incremental signal by at least one phase sensor 120 in a second step b) (method step 176); an output of the absolute position signal to at least one control unit 154 via at least one digital interface 122 in a third step c) (method step 178); an output of the incremental signal to control unit 154 via at least one incremental interface 124 in a fourth step d) (method step 180); a determination of the rotation characteristic by control unit 154 with the aid of at least one of the following signals: the absolute position signal; the incremental signal in a fifth step (method step 182).

The method may be carried out, in particular, using a sensor system 110 according to the present invention, i.e., according to one of the aforementioned specific embodiments or according to one of the specific embodiments described in greater detail below. Within the scope of the present invention, the expression from step e), "determining the rotation characteristic by control unit 154 with the aid of at least one of the following signals: the absolute position signal; the incremental signal," may be understood to mean, in particular, that the rotation characteristic is determined from the absolute position signal; or that the rotation characteristic is determined from the incremental signal; or that the rotation characteristic is determined using the absolute position signal and/or using the incremental signal. In step e), in particular, a second position signal may be generated by control unit 154 by correcting the absolute position signal with the aid of the incremental signal, the rotation characteristic being determined with the aid of the second position signal. The method may further include a step f), which is not illustrated in FIG. 5:

f) comparing the second position signal with the absolute position signal.

Furthermore, the comparison may include a formation of a difference D between the absolute position signal and the second position signal. In particular, the rotation characteristic may be determined using the absolute position signal if difference D is less than a threshold value $D_s$, the rotation characteristic being able to be determined using the second position signal if difference D is greater than threshold value $D_s$. In particular, threshold value $D_s$ may include a value of difference D between the absolute position signal and the second position signal. In particular, threshold value $D_s$ may include the value of difference D between the absolute position signal and the second position signal, and the value of the difference may have a value of 0.1° to 1°, in particular electrical or between electrical position signals. Threshold value $D_s$ may also include a frequency of the incremental signal. The output of the absolute position signal in step c) may also take place with the aid of at least one digital interface 122, which includes at least one SENT interface 156 and/or at least one PSI5 interface. The output of the incremental signal in step d) may also take place with the aid of at least one incremental interface 124, which includes at least one comparator circuit and/or at least one Schmitt trigger 158. In particular, the method may include the preparation of the at least one absolute position signal by at least one first evaluation circuit 162. In particular, the method may include the preparation of the at least one incremental signal by a second evaluation circuit. In particular, first evaluation circuit 162 and second evaluation circuit 164 may be situated on a shared circuit carrier 166. Alternatively, first evaluation circuit 162 and second evaluation circuit 164 may be situated on two separate circuit carriers 166. The method may also include an output of at least one piece of sensor status information. In particular, the piece of sensor status information may be output via the at least one digital interface 122. In particular, the absolute position signal output via digital interface 122 may include the piece of sensor status information.

What is claimed is:

1. A sensor system for determining at least one rotation characteristic of a rotating element, which is for rotating around at least one rotation axis, comprising:
   at least one sensor wheel, which is connectable to the rotating element, the sensor wheel having a sensor wheel profile;
   at least one position sensor;
   at least one phase sensor;
   at least one digital interface; and
   at least one incremental interface;
   wherein the sensor system is configured to output at least one absolute position signal generated using the at least one position sensor via the digital interface and to output at least one incremental signal generated using the at least one phase sensor via the at least one incremental interface.

2. The sensor system as recited in claim 1, further comprising:

at least one control unit to detect the at least one position signal and the at least one incremental signal via the at least one digital interface and the at least one incremental interface, respectively.

3. The sensor system as recited in claim 2, wherein the at least one control unit is further configured to determine at least one second position signal using the at least one absolute position signal and the at least one incremental signal, the at least one rotation characteristic being is determinable from the at least one second position signal.

4. The sensor system as recited in claim 2, wherein the at least one control unit is further configured to compare the at least one second position signal with the at least one absolute position signal.

5. The sensor system as recited in claim 2, wherein the at least one control unit is configured to form a difference between the at least one absolute position signal and the at least one second position signal.

6. The sensor system as recited in claim 5, wherein the at least one control unit is configured to determine the at least one rotation characteristic from the at least one absolute position signal when the difference is less than a threshold value, the at least one control unit being configured to determine the at least one rotation characteristic from the at least one second position signal when the difference is greater than the threshold value.

7. The sensor system as recited in claim 1, wherein the at least one digital interface includes at least one of a SENT interface and/or a PSI5 interface.

8. The sensor system as recited in claim 1, wherein the at least one incremental interface includes at least one of a comparator circuit and/or a Schmitt trigger.

9. The sensor system as recited in claim 1, further comprising:
at least one evaluation unit, including at least one first evaluation circuit to prepare the at least one absolute position signal.

10. A method for determining at least one rotation characteristic of a rotating element, which is for rotating around at least one rotation axis using at least one sensor wheel, which is connectable to the at least one rotating element, the at least one sensor wheel having a sensor wheel profile, the method comprising:
a) generating at least one absolute position signal using at least one position sensor;
b) generating at least one incremental signal using at least one phase sensor;
c) outputting the absolute position signal to at least one control unit via at least one digital interface;
d) outputting the at least one incremental signal to the at least one control unit via at least one incremental interface; and
e) determining the rotation characteristic by the control unit using at least one of the at least one absolute position signal and/or the at least one incremental signal.

11. The method as recited in claim 10, wherein, in e), a second position signal is generated by the at least one control unit by correcting the at least one absolute position signal using the at least one incremental signal, and wherein the rotation characteristic is determined using the at least one second position signal.

12. The method as recited in claim 11, further comprising:
f) comparing the at least one second position signal with the at least one absolute position signal.

13. The method as recited in claim 12, wherein the comparing includes forming a difference between the at least one absolute position signal and the at least one second position signal.

14. The method as recited in claim 13, wherein the at least one rotation characteristic is determined using the at least one absolute position signal when the difference is less than a threshold value, and wherein the rotation characteristic is determined using the at least one second position signal when the difference is greater than the threshold value.

15. The method as recited in claim 14, wherein the threshold value includes a value of the difference between the at least one absolute position signal and the at least one second position signal.

* * * * *